Nov. 3, 1936.                F. R. ERNST                2,059,858
                            FIXTURE SUPPORT
                          Filed May 28, 1935
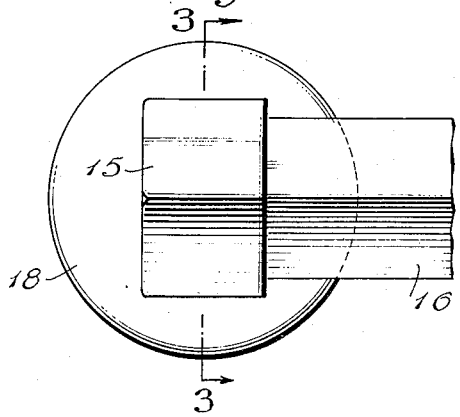
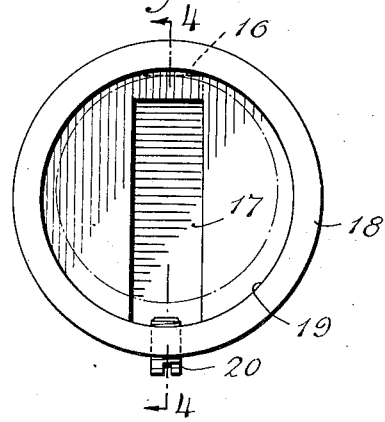
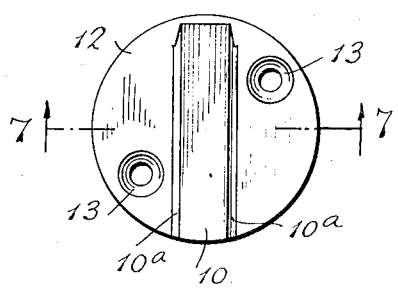
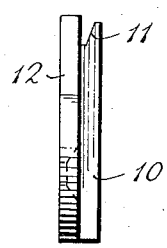
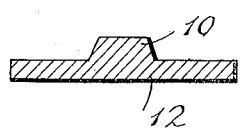
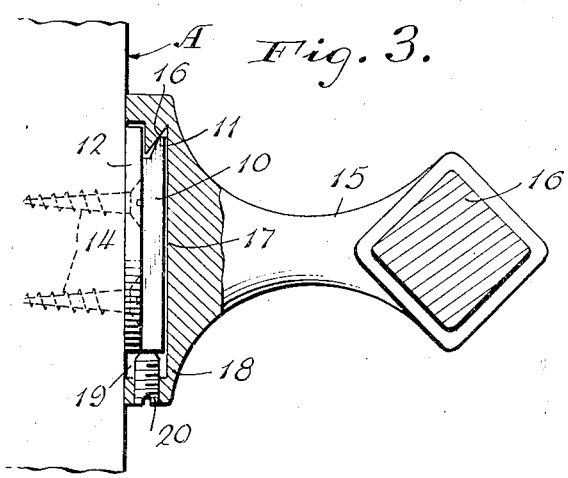
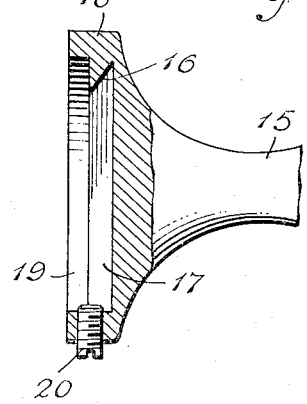
INVENTOR
FRANK R. ERNST
BY
ATTORNEYS Patented Nov. 3, 1936

2,059,858

UNITED STATES PATENT OFFICE 2,059,858

FIXTURE SUPPORT

Frank R. Ernst, Woodridge, N. J.

Application May 28, 1935, Serial No. 23,813

2 Claims. (Cl. 248—223)

The invention relates to supports for fixtures and has for its object to provide a support of novel construction whereby the fixture may be mounted upon a wall or equivalent element in an efficient and simple manner. The invention contemplates further the provision of a device of the indicated type which may be economically produced and which, in use, presents an ornamental and attractive appearance and requires no particular skill in the operation of mounting and dismounting the various elements. Other more specific objects will appear from the description hereinafter and the features of novelty will be pointed out in the claims.

In the accompanying drawing, which illustrates an example of the invention without defining its limits, Fig. 1 is a fragmentary front view of the novel fixture support; Fig. 2 is a rear view of the fixture showing parts of the fixture support; Fig. 3 is a sectional view on the line 3—3 of Fig. 1 with parts shown in elevation; Fig. 4 is a similar view on the line 4—4 of Fig. 2; Fig. 5 is a face view of the supporting device forming part of the fixture support; Fig. 6 is a side view of said device, and Fig. 7 is a sectional view on the line 7—7 of Fig. 5.

In the illustrated example the novel fixture support is shown in a form adapted particularly for that type of fixture commonly referred to as a towel rack as customarily installed in bathrooms and the like; it is to be understood that this form has been selected for purposes of illustration and description only and that it accordingly is not intended to define the limits of the invention.

As shown, the fixture support comprises a supporting device consisting of a supporting member 10 which may be of elongated form and in any case is provided with an outwardly bevelled upper end 11, said supporting member including attaching means whereby said member is secured to a wall or other element on which it is desired to mount the fixture; in the illustrated example the attaching means is shown in the form of a disk 12 provided with openings 13 for the accommodation of screws 14 whereby said supporting disk 12 may be fastened in place on the wall or its equivalent. It will be understood that the supporting disk 12 may be replaced by other means adapted to perform the intended functions and that other fastening devices may be substituted for the screws 14 if this should be desired. The fixture 15 in the drawing comprises a bracket adapted to co-operate with a duplicate bracket for the support of a bar 16, the fixture in its illustrated form as previously stated being of the type commonly referred to as a towel rack; the details and type of the fixture 15 are also of no importance in connection with the instant invention and may be of many different forms dependent upon the use for which the fixture is designed. In all of its forms the fixture is provided with the co-operating elements of the fixture support and accordingly is provided with an undercut seat 16 which, in the illustrated example, is located at the upper end of a recess 17 for the accommodation of the supporting member 10 and in such case corresponding to the shape thereof. To facilitate the mounting of the fixture 15 upon the supporting device the supporting member 10 may be formed with bevelled sides 10$^a$, as shown in Figs. 5 and 7. When the fixture support is constructed in the form illustrated, the supporting member 10 may be formed upon the outer surface of the supporting disk 12 in diametric relation thereto and the recess 17 with its undercut seat 16 may extend in diametral relation to a plate 18 which in the form shown includes a recess 19 and is adapted in the connected condition of the elements to set over and conceal the supporting member 10 and the supporting disk 12 or its equivalent. In all forms of the fixture support the connecting means permanently carried by the supporting device and the fixture respectively are adapted to co-operate with each other to develop a camming action whereby the fixture is forced toward said supporting device and firmly fixed in operative position thereon as will be more particularly pointed out hereinafter. For this purpose the specific construction shown in the drawing illustrates the angle of the bevelled upper end 11 of the supporting member 10 as less than the angle of the bevelled undercut seat 16 with which the fixture 15 is provided. With this arrangement any downward movement of the fixture 15 relatively to the supporting member 10 when the parts occupy the position shown in Fig. 3 will cause the bevelled undercut seat 16 in co-operation with the bevelled upper end 11 to develop a camming action which tends to force the fixture 15 toward said supporting member or, in other words, toward the wall A or equivalent element on which the fixture support and fixture are mounted to thereby firmly fix said fixture in operative position on the supporting device. To attain this result the fixture 15 is provided with fastening means which in the illustrated example is shown in the form of a set screw 20 located in registry with the undercut seat 16 and in the specific illustration in registry with the recess 17. The set screw 20 is adapted to engage the lower end of the supporting member 10 and to thereby not only connect the fixture 15 with the supporting device but to force the bevelled upper end 11 of the supporting member 10 into the undercut seat 16 to thereby force the fixture toward the supporting device and toward the wall A or its equivalent.

In practice the screw 20 or equivalent fastening means is adjusted to a position to permit the fixture to be placed over the supporting device with the bevelled upper end 11 extending into the undercut seat 16, it being understood that the parts are so dimensioned and designed as to readily permit these operations. The set screw 20 or equivalent fastening means is then adjusted as will be readily apparent to engage and screw against the lower end of the supporting member 10 and to thereby firmly fix the fixture in operative position thereon, as previously set forth. The diametral recess 17 of the fixture plate 18 in addition to accommodating the supporting member 10 serves in cooperation therewith to facilitate the desired introduction of the bevelled upper end 11 into the undercut seat 16. When removal of the fixture is desired for any reason the screw 20 or equivalent fastening means is adjusted or unscrewed sufficiently to permit the plate 18 with the fixture 15 to be raised relatively to the supporting device to thereby withdraw the bevelled upper end 11 from the undercut seat 16 and thus to disconnect the elements of the fixture support from each other and permit the ready removal of the fixture 15.

The fixture support is simple in construction and capable of being economically produced and when the elements of said fixture support are connected with each other the assembly presents a highly ornamental and attractive appearance in which the supporting elements are completely hidden from view and the fixture is firmly secured in place. The arrangement furthermore is such that the operations of mounting and dismounting the fixture 15 on or from the supporting device may be readily accomplished and require no particular skill in their performance. The novel fixture support may be utilized for efficiently mounting all types of bathroom and equivalent fixtures, and furthermore may be utilized for correspondingly mounting many other types of fixtures or their equivalent.

Various changes in the specific forms shown and described may be made within the scope of the claims without departing from the spirit of the invention.

I claim:

1. A fixture support comprising a supporting member having an outwardly bevelled upper end, a fixture having a recess adapted to accommodate said supporting member and provided at one end with an outwardly bevelled undercut seat adapted to receive said bevelled upper end, the angle of said bevelled upper end being less than the angle of said bevelled undercut seat whereby said bevels co-operate to develop a camming action, and a screw carried by said fixture in registry with said recess and adapted to engage the lower end of said supporting member whereby said bevelled undercut seat is drawn against said bevelled upper end to force said fixture toward said supporting member and firmly fix said fixture in operative position thereon.

2. A fixture support comprising an elongated supporting member having a bevelled upper end, a fixture having an elongated recess adapted to accommodate said supporting member and provided with a bevelled undercut seat at one end adapted to receive said bevelled upper end, the angles of said bevelled upper end and bevelled undercut seat being different from each other to develop a camming action in cooperation with each other, and a screw carried by said fixture in registry with said recess and adapted to engage the lower end of said supporting member whereby said bevelled undercut seat and bevelled upper end are drawn together to force said fixture toward said supporting member and firmly fix said fixture in operative position thereon.

FRANK R. ERNST.